Patented Jan. 22, 1935

1,988,823

UNITED STATES PATENT OFFICE 1,988,823

RUST REMOVER

Carl Winning and John Tuttle, Elizabeth, N. J., assignors to Stanco Incorporated, a corporation of Delaware No Drawing. Application January 26, 1932, Serial No. 589,055

13 Claims. (Cl. 87—5)

This invention relates to a composition for removing rust from metallic surfaces. More particularly it relates to a composition adapted for the cleaning of the radiators of internal combustion engines or the like.

With a preferred embodiment in mind but without intention to limit the invention more than is required by the prior art, the composition comprises an ammonium salt of a mineral acid, an alkali salt of a water-soluble organic acid, sugar, a protective agent or colloid for suspended rust precipitate and a corrosion inhibitor. The ammonium salt of a mineral acid functions as an active ingredient for momentarily dissolving the rust which is then immediately precipitated from solution as the finely divided iron hydroxide with regeneration of the ammonium salt. The alkali salt of an organic acid serves to deflocculate the rust precipitate by forming chemical complexes therewith. It effects also a similar though less rapid removal of the rust. Of the weak acid salts, the ammonium salts are preferred. The sugar aids in the deflocculation of the rust. The protective agent or colloid by coating the liberated particles keeps the precipitate from settling out of the liquid, so that it may be efficiently flushed from the system. The corrosion inhibitor reduces the effect of the composition upon such materials as copper, brass, aluminum and solder.

By way of example, a suitable composition is as follows:

| | By weight |
|---|---|
| Ammonium sulfate | 100 lbs. |
| Ammonium citrate | 50 lbs. |
| Sugar | 18 lbs. |
| Sodium alginate | 18 lbs. |
| Pyrogallol | 1 lb. |

Water sufficient to make 100 gals.

In the above composition the ammonium sulfate may be replaced by ammonium chloride or ammonium salt of other mineral acid. The ammonium citrate may be replaced by sodium, potassium, or ammonium salts of such weak organic acids as acetic, tartaric, citric, tannic acid, or the like. The sodium alginate may be replaced by gellatin, glue, agar-agar, or the like, all of which are commonly known as protective colloids. The pyrogallol may be replaced by hydroquinone or any other inhibitor which is sufficiently water soluble. The term "corrosion inhibitor" is maintained to mean the usual pickling inhibitors such as pyridine and quinoline or those used to retard oxidation such as hydroquinone and pyrogallol. The percentages of the ingredients in the composition can be varied as desired to obtain the maximum efficiency of removal of the rust. The ammonium citrate and sugar together modify the form of the iron hydroxide so that it is more readily held in suspension by the sodium alginate which is added as a protective agent.

An alternative form of composition is as follows:

| | By weight |
|---|---|
| Ammonium chloride | 100 lbs. |
| Sodium acetate | 50 lbs. |
| Sugar | 18 lbs. |
| Glue | 18 lbs. |
| Hydroquinone | 1 lb. |

Water sufficient to make 100 gallons.

In the above composition the ammonium chloride functions similarly to the ammonium sulfate to dissolve and reprecipitate the rust. The sodium acetate effects a similar though less rapid solution of the rust and in addition with the sugar it modifies the form of the iron hydroxide so that it can be more readily held in suspension. The glue functions as the protective agent for holding the precipitated iron oxide in suspension. Since, even in the absence of an inhibitor, the composition is scarcely corrosive, it is permissible to omit the inhibitor when rapid cleaning can be assured, as for instance, when the composition is introduced into a hot cooling system, well circulated for thirty minutes and then drained.

The compositions are yellowish, mobile, cloudy appearing liquids. They are non-poisonous and non-injurious to clothing or to the finish of automotive vehicles. Their action in removing rust is swift and specific.

In utilizing the composition for removing rust from the radiator of an automotive vehicle, the radiator is preferably drained and flushed before adding the composition. The radiator is then substantially filled with clean water and the composition is added to the water in the proportion of approximately one pint of the composition to four gallons of the water. The motor of the vehicle is then driven for a substantial period of time to cause circulation of the composition through the radiator. For example, the automotive vehicle can be driven for a period of approximately five to seven days after which the radiator is drained and is flushed thoroughly with fresh water to wash out all of the rust and dirt. The draining and flushing are best accomplished by idling the motor rapidly until the water in the cooling system is too hot to touch. The engine is then stopped and the radiator is drained as rapidly as possible. The loosened rust is kept from settling in the fine tubes of the radiator by the protective action of the glue. The liquid removed from the radiator is muddy, reddish brown in color and is heavy with rust. The cleaned radiator should be well flushed with water after the cleaner has been drained out. Sometimes it will be preferable to merely introduce the cleaner to the hot system, idle hot (approximately 160–200° F.) for approximately one-half to one hour, and then drain and flush. While the composition has been described as used for cleaning the radiator of automotive vehicles, it will be understood that it can be utilized for removing rust from other metallic surfaces.

It will be understood that the composition can be modified for a particular use. For example, certain of the salts of the weak acids such as the citrates or tartrates quickly attack copper and zinc if slightly on the acid side, and on the other hand, if alkaline may attack aluminum. Accordingly the salt should be carefully balanced when used in cleaning rusty systems containing these metals. Tannates can be employed where a disagreeable black deposit is of no importance.

Various changes may be made within the scope of the appended claims in which it is desired to claim all novelty inherent in the invention as broadly as the prior art permits.

We claim:

1. A composition of matter for removing rust from metallic surfaces, comprising an ammonium salt of a mineral acid, an alkali metal salt of a water-soluble organic acid, sugar, a protective colloid and an inhibitor of corrosion.

2. A composition of matter for removing rust from metallic surfaces, comprising ammonium chloride, an alkali metal salt of a weak water-soluble organic acid, sugar, a protective colloid and an inhibitor of corrosion.

3. A composition of matter for removing rust from metallic surfaces, comprising ammonium chloride, an alkali metal salt of acetic acid, sugar, a protective colloid, and an inhibitor of corrosion.

4. A composition of matter for removing rust from metallic surfaces, comprising ammonium chloride, ammonium citrate, sugar, a protective colloid and an inhibitor of corrosion.

5. A composition of matter for removing rust from metallic surfaces, comprising ammonium chloride, sodium acetate, sugar, glue and hydroquinone.

6. A composition of matter for removing rust from metallic surfaces, comprising ammonium sulfate, ammonium citrate, sugar and sodium alginate.

7. A composition of matter for removing rust from metallic surfaces comprising ammonium chloride, glue, and a corrosion inhibitor.

8. A composition of matter for removing rust from metallic surfaces, comprising ammonium chloride and glue.

9. A composition of matter for removing rust from metallic surfaces, comprising an ammonium salt of a mineral acid, alkali metal salt of citric acid and sugar.

10. Composition of matter for removing rust from metallic surfaces, comprising an ammonium salt of a mineral acid together with the following types of materials: an alkali metal salt of a water-soluble organic acid of the group consisting of acetic, tartaric, citric and tannic acids, sugar, and a protective colloid of the group consisting of gelatin, glue, agar-agar and sodium alginate, and a corrosion inhibitor of the group consisting of oxidation inhibitors such as hydroquinone and pyrogallol and pickling inhibitors such as pyridine and quinoline.

11. Method of removing rust from metallic surfaces, which comprises contacting said metallic surfaces with a substantially neutral solution of an ammonium salt of a mineral acid, together with the following types of materials: an alkali metal salt of a water-soluble organic acid, a water-soluble carbohydrate deflocculating agent, and a protective colloid.

12. A composition of matter for removing rust from metallic surfaces, comprising an aqueous solution of 100 parts ammonium sulfate, 50 parts ammonium citrate, 18 parts sugar, 18 parts sodium alginate and 1 part pyrogallol.

13. A composition of matter for removing rust from metallic surfaces, comprising an aqueous solution of 100 parts ammonium chloride, 50 parts sodium acetate, 18 parts sugar, 18 parts glue and 1 part hydroquinone.

CARL WINNING.
JOHN TUTTLE.